United States Patent
Shankar et al.

(10) Patent No.: US 9,734,201 B2
(45) Date of Patent: *Aug. 15, 2017

(54) OPTIMIZING PARALLEL QUERIES USING INTERESTING DISTRIBUTIONS

(71) Applicant: Microsoft Technology Licensing, LLC, Redmond, WA (US)

(72) Inventors: Srinath Shankar, Madison, WI (US); Rimma V. Nehme, Madison, WI (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/953,297

(22) Filed: Nov. 27, 2015

(65) Prior Publication Data

US 2016/0078090 A1 Mar. 17, 2016

Related U.S. Application Data

(63) Continuation of application No. 13/710,470, filed on Dec. 11, 2012, now Pat. No. 9,229,979.

(51) Int. Cl.
*G06F 17/30* (2006.01)

(52) U.S. Cl.
CPC .. *G06F 17/30466* (2013.01); *G06F 17/30445* (2013.01); *G06F 17/30486* (2013.01); *G06F 17/30525* (2013.01)

(58) Field of Classification Search
CPC ......... G06F 17/30498; G06F 17/30595; G06F 17/30466

(Continued)

(56) References Cited

U.S. PATENT DOCUMENTS 5,598,559 A * 1/1997 Chaudhuri ........ G06F 17/30454
5,822,747 A 10/1998 Graefe et al.
(Continued)

OTHER PUBLICATIONS

Ganguly et al, "Query Optimization for Parallel Execution", 1992 ACM SIGMOD—6/92/CA, USA, 18 pages.*

(Continued)

*Primary Examiner* — Rehana Perveen
*Assistant Examiner* — Loc Tran
(74) *Attorney, Agent, or Firm* — Dodd Law Group; Michael B. Dodd

(57) ABSTRACT

The present invention extends to methods, systems, and computer program products for optimizing parallel queries using interesting distributions. For each logical operator in an SQL server MEMO, in a top down manner from a root operator to the leaf operators, interesting distributions for the operators can be identified based on the properties of the operators. Identified interesting distributions can be propagated down to lower operators by annotating the lower operators with the interesting distributions. Thus, a SQL server MEMO can be annotated with interesting distributions propagated top down from root to leaf logical operators to generate an annotated SQL server MEMO. Parallel query plans can then be generated from the annotated SQL server MEMO in a bottom up manner from leaf operators to a root operator. Annotated interesting properties can be used to prune operators, thereby facilitating a more tractable search space for a parallel query plan.

18 Claims, 7 Drawing Sheets

(58) Field of Classification Search
USPC .................................... 707/714, 718, 719
See application file for complete search history.

(56) References Cited

U.S. PATENT DOCUMENTS

| | | | |
|---|---|---|---|
| 6,625,593 B1* | 9/2003 | Leung ............... | G06F 17/30445 |
| 8,086,598 B1 | 12/2011 | Lamb et al. | |
| 8,166,022 B2 | 4/2012 | Han et al. | |
| 2012/0117065 A1 | 5/2012 | Nehme et al. | |
| 2012/0166402 A1* | 6/2012 | Pederson .......... | G06F 17/30312 |
| | | | 707/692 |

OTHER PUBLICATIONS

"Final Office Action Issued in U.S. Appl. No. 13/710,470", Mailed Date: Dec. 12, 2014, 19 Pages.
"Non-Final Office Action Issued in U.S. Appl. No. 13/710,470", Mailed Date: Jun. 20, 2014, 17 Pages.
"Non-Final Office Action Issued in U.S. Appl. No. 13/710,470", Mailed Date: Apr. 30, 2015, 19 Pages.
"Notice of Allowance Issued in U.S. Appl. No. 13/710,470", Mailed Date: Aug. 28, 2015, 10 Pages.
Berg, et al., "Analysis of a Dynamic Query Optimization Technique for Multijoin Queries", Journal of Systems and Software, Dec. 1994, pp. 233-241.
Deshpande, et al., "Flow Algorithms for Parallel Query Optimization", 24th International Conference on Data Engineering, Apr. 7, 2008, 10 Pages.
Ganguly, et al., "Query Optimization for Parallel Execution", In Proceedings of the ACM SIGMOD international conference on Management of data, Jun. 2, 1992, pp. 9-18.
Han, et al., "Dependency-Aware Reordering for Parallelizing Query Optimization in Multi-Core CPUs", In Proceedings of ACM SIGMOD International Conference on Management of data, Jun. 29, 2009, pp. 45-57.
Nehme, et al., "Automated Partitioning Design in Parallel Database Systems", In Proceedings of the ACM SIGMOD International Conference on Management of Data, Jun. 12, 2011, pp. 1137-1148.
Schikutta, et al., "A Knowledge Base for the Optimization of Parallel Query Execution Plans", Third International Symposium on Parallel Architectures, Algorithms and Networks., Dec. 18, 1997, 7 Pages.

* cited by examiner

Accessing a SQL Server MEMO for a query of a distributed database, the SQL Server MEMO including a plurality of groups of logical operators arranged in a hierarchically structure, the hierarchical structure including a root group, one or more intermediate groups, and one or more leaf groups, each group of logical operators including one or more logical operators on one or more input groups.   201

For each of the plurality of groups, starting at the root group and in a top down manner:

Identifying interesting distributions relevant to any child groups of the group   202

Adding the identified interesting distributions to the child groups by annotating the child groups with the interesting distributions   203

*Fig. 2*

OPTIMIZING PARALLEL QUERIES USING INTERESTING DISTRIBUTIONS

CROSS-REFERENCE TO RELATED APPLICATIONS

This application is a continuation of and claims the benefit of and priority to U.S. patent application Ser. No. 13/710,470, entitled "Optimizing Parallel Queries Using Interesting Distributions", filed Dec. 11, 2012 by Srinath Shankar et al., the entire contents of which are expressly incorporated by reference.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, database management, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments.

In some environments, queries are issued against a corpus of data to facilitate targeted information retrieval from the corpus of data. A user (or even a computer system) formulates a query using constructs from a query language. A query language typically includes a number of constructs that can be grouped into different combinations to express a logical intent for retrieving data. The query is issued to a data management system for processing. The data management system translates the query into a corresponding set of compatible physical operations (sometimes and hereinafter referred to as a "query plan") for realizing the expressed logical intent. The query plan can then be executed to retrieve data from the corpus of data in accordance with the expressed logical intent. Retrieved data can be returned to the query issuer.

For example, SQL can be used to formulate a query for retrieving data from a relational database. The query is issued to a database management system that controls access to the relational database. The database management system translates the query into a query plan. The query plan is then executed to retrieve data from the relational database. The retrieved database data can be returned to the query issuer.

Using constructs of a query language, there can be any number of different ways to express the same logical intent for retrieving data. When translating a query, there can also be any number of ways to combine physical operations into a query plan for realizing an expressed logical intent. Thus, generally, different sets of physical operations can be executed to realize a logical intent that can also be expressed in different ways.

However, different query plans (i.e., different arrangements of physical operations), all of which correctly realize the same logical intent, can have different performance based on system hardware and configuration, data layout, etc. For example, one query plan for a query might execute in 5 seconds, while another query plan for the same query might execute in 15 seconds.

As such, many data management systems use a query optimizer. A query optimizer evaluates various different possible query plans for a query. The query optimizer attempts to select a better performing query plan for a query (e.g., relative to other query plans for obtaining the same result) based on a query's expressed logical intent and data layout.

Some database systems are standalone (or single node) database systems where all data and optimization data is physically stored at the same machine. For a standalone database system, physical operations in a query plan are typically executed using serial, sequential processing. Query optimization is also relatively straightforward. Since all information for optimization is available in a single location, a query optimizer can relatively easily refer to the information and select higher performing query plans.

Other database systems are parallel database systems. In a parallel database system, database storage is spread across a number of nodes. Each node stores one or more portions of a database locally. Other modules (e.g., at a control node) abstract the distributed nature of the database from users such that it appears as a single unified database. As such, in a parallel database system, data relevant to a query as well as data used for query plan optimization can be spread out across a number of different nodes.

Parallel databases improve performance for tasks such as loading data and building indices. Parallel databases improve processing and input/output speeds by using multiple central processing units (CPUs) (including multi-core processors) and storage in parallel. In parallel processing, many operations are performed simultaneously, as opposed to serial, sequential processing, where operations are performed with no time overlap. Parallel databases can be implemented in different architectures including: a shared memory architecture (multiple processors share memory space and other data storage), a shared disk architecture (each processing unit has its own memory but shares other data storage), and a shared-nothing architecture (each processing unit has its own memory space and its own other data storage).

In a parallel database environment, query plan optimization can be somewhat more complicated as data relevant to a query as well as data used for query plan optimization are distributed across a number of nodes (which, for example, in a shared-nothing architecture may not even be aware of each other's existence). Further, query plans for parallel database systems can include additional (e.g., data movement) operations, not used when querying standalone database systems, which also have to be optimized. As such, query plan search spaces can become quite large, reducing the efficiency of identifying an appropriate query plan.

BRIEF SUMMARY

The present invention extends to methods, systems, and computer program products for optimizing parallel queries using interesting distributions. In some embodiments, interesting properties within a SQL server MEMO are identified and propagated. Accessing a SQL Server MEMO for a query of the distributed database is accessed. The SQL Server MEMO includes a plurality of groups of logical operators arranged in a hierarchically structure. The hierarchical structure includes a root group, one or more intermediate groups, and one or more leaf groups. Each group of logical operators includes one or more logical operators on one or more input groups.

For each of the plurality of groups, starting at the root group and in a top down manner, interesting distributions relevant to any child groups of the group are identified. The identified interesting distributions are added to the child groups by annotating the child groups with the interesting distributions. Interesting distributions can include, for example, any of: hash distributions on equi-join predicates for joins, hash distributions of group-by/partitioning columns for grouping/partitioning operators, replicated distributions for a join operator, replicated distributions for a grouping operator, replicated distributions for a partitioning operator, and indications that a table is located on a control node of a distributed database.

In other embodiments, a query plan search space is pruned. An annotated SQL Server MEMO for a query of the distributed database is access. The annotated SQL Server MEMO includes a plurality of groups of logical operators arranged in a hierarchically structure. The hierarchical structure includes a root group, one or more intermediate groups, and one or more leaf groups. Each group of logical operators includes one or more logical operators on one or more input groups. One or more groups in the annotated SQL Server MEMO are annotated with properties indicating an interesting distribution of a parent group.

For each of the plurality of groups, starting at the leaf groups and in a bottom up manner for each logical operator in the group, a plurality of possible input physical operators for implementing the logical operator are examined. Any appropriate data movement operators are inserted to make the logical operator distribution compatible. Each of the plurality of possible input physical operators is costed. The plurality of physical operators is pruned by: retaining the physical operator with the cheapest cost, retaining the physical operator with the cheapest cost that has an output distribution that matches the interesting distribution of a parent group, and removing any other physical operators.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2 illustrates a flow chart of an example method for identifying and propagating interesting properties within a SQL Server MEMO.

DETAILED DESCRIPTION

Figure 1:
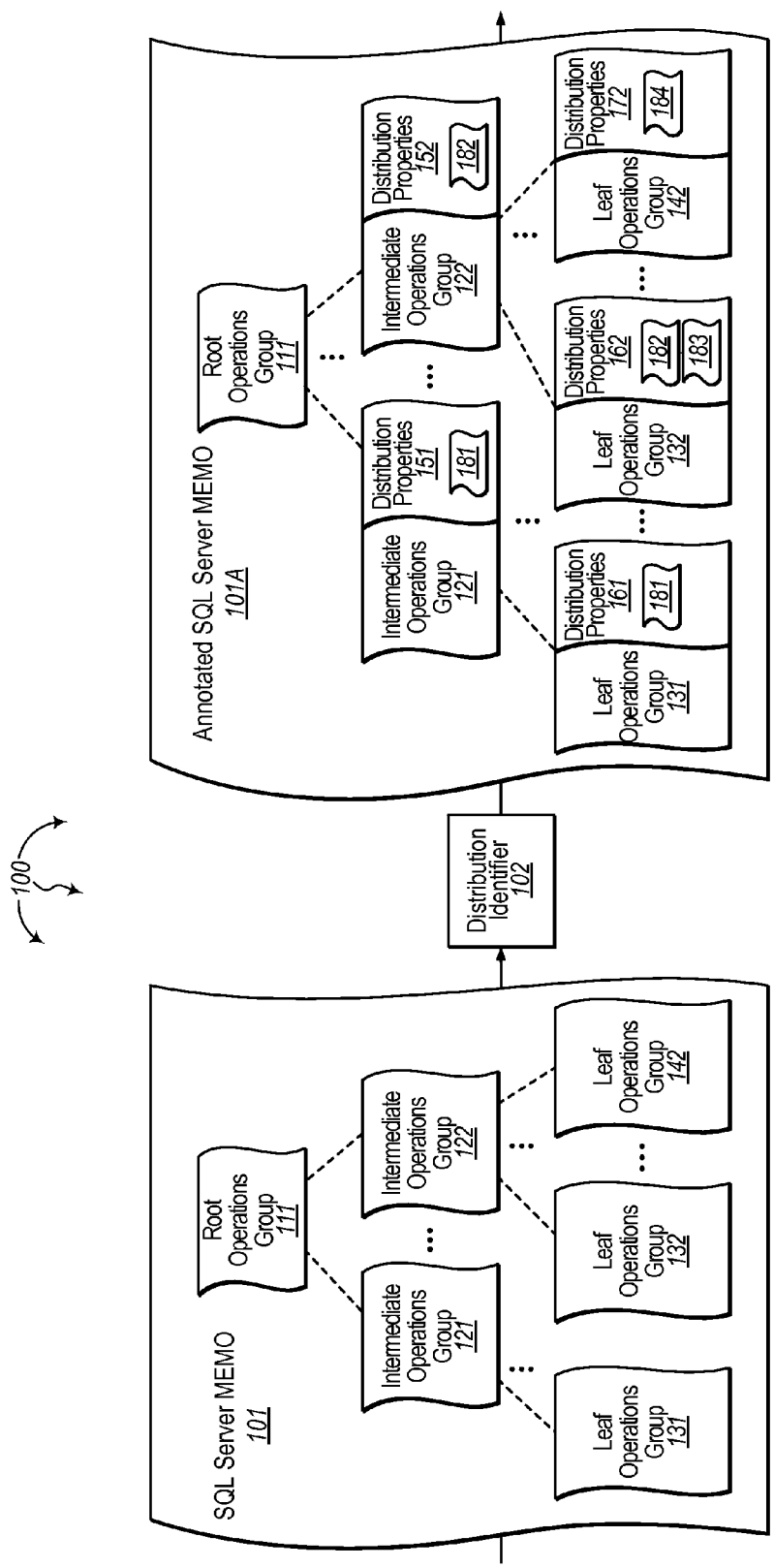
FIG. 1 illustrates an example computer architecture that facilitates identifying and propagating interesting properties within a SQL Server MEMO.

The present invention extends to methods, systems, and computer program products for optimizing parallel queries using interesting distributions. In some embodiments, interesting properties within a SQL server MEMO are identified and propagated. Accessing a SQL Server MEMO for a query of the distributed database is accessed. The SQL Server MEMO includes a plurality of groups of logical operators arranged in a hierarchically structure. The hierarchical structure includes a root group, one or more intermediate groups, and one or more leaf groups. Each group of logical operators includes one or more logical operators on one or more input groups.

For each of the plurality of groups, starting at the root group and in a top down manner, interesting distributions relevant to any child groups of the group are identified. The identified interesting distributions are added to the child groups by annotating the child groups with the interesting distributions. Interesting distributions can include, for example, any of: hash distributions on equi-join predicates for joins, hash distributions of group-by/partitioning columns for grouping/partitioning operators, replicated distributions for a join operator, replicated distributions for a grouping operator, replicated distributions for a partitioning operator, and indications that a table is located on a control node of a distributed database.

In other embodiments, a query plan search space is pruned. An annotated SQL Server MEMO for a query of the distributed database is access. The annotated SQL Server MEMO includes a plurality of groups of logical operators arranged in a hierarchically structure. The hierarchical structure includes a root group, one or more intermediate groups, and one or more leaf groups. Each group of logical operators includes one or more logical operators on one or more input groups. One or more groups in the annotated SQL Server MEMO are annotated with properties indicating an interesting distribution of a parent group.

For each of the plurality of groups, starting at the leaf groups and in a bottom up manner for each logical operator in the group, a plurality of possible input physical operators for implementing the logical operator are examined Any appropriate data movement operators are inserted to make the logical operator distribution compatible. Each of the plurality of possible input physical operators is costed. The plurality of physical operators is pruned by: retaining the physical operator with the cheapest cost, retaining the physical operator with the cheapest cost that has an output distribution that matches the interesting distribution of a parent group, and removing any other physical operators.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the claims, a "cloud computing environment" is an environment in which cloud computing is employed.

In this description and in the following claims, a "MEMO" is defined as a generic structure for organizing a search space. The internal structure of MEMO can viewed as collection of sub-goals that are themselves a collection of last steps that depend on other sub-goals. Within a MEMO, the solution to reaching a goal can address managing different possibilities for what the last step in the sequence (i.e., the last action required to achieve the goal) might be and to treat the task of managing different ways of getting to those possible last steps as a sub-goal to be solved later.

For the arithmetic problem "1+2+3", for example, the last step might be adding 1 to a sub-goal (the sum of 2 and 3), or it might be adding 2 to a sub-goal (the sum of 1 and 3), or it might be adding 3 to a sub-goal (the sum of 1 and 2). If combinations for accomplishing the sub-goals for each of these possible last steps were reproducible, then it would be possible to reproduce the possible combinations of accomplishing the original goal by just tacking the appropriate last step on to the end of each possible way that its sub-goal(s)

could be accomplished. This strategy can be applied recursively to each of the identified sub-goals. Eventually, an entire search space flattens out into a collection sub-goals to solve (the original goal is just a special sub-goal). Each of these sub-goals itself contains a collection of all of the possible "last steps" (tagged with the sub-goals they depend on) that could be performed to accomplish that particular sub-goal.

Embodiments of the invention include optimizing parallel queries using interesting distributions. Within a SQL server MEMO logical operators can be arranged hierarchically within a root operator, one or more intermediate levels of operators, and one or more leaf operators. For each logical operator in an SQL server MEMO, in a top down manner from a root operator to the leaf operators, interesting distributions for the operators can be identified based on the properties of the operators. Identified interesting distributions can be propagated down to lower operators by annotating the lower operators with the interesting distributions. Thus, a SQL server MEMO can be annotated with interesting distributions propagated top down from root to leaf logical operators to generate an annotated SQL server MEMO. Interesting distributions include: hash distributions on equi-join predicates for joins, hash distributions of group-by/partitioning columns for grouping/partitioning operators, replicated distributions for a join operator, replicated distributions for a grouping operator, replicated distributions for a partitioning operator, indications that a table is located on a control node of a distributed database, etc.

Interesting properties can be inherited from higher operators or can be identified at an operator. An inherited interesting property may or may not applicable to an operator but can be retained for propagation down to the further operators (where it may be applicable).

Parallel query plans can then be generated from an annotated SQL server MEMO in a bottom up manner from leaf operators to a root operator. Annotated interesting properties can be used to prune parallel operators, thereby facilitating a more tractable search space for a parallel query plan. For each logical operator, possible input physical operators are examined and it is determined if the physical operator is distribution compatible. It not, movement operators are inserted to make the logical operator distribution compatible. Physical operators are then costed. The physical operators are pruned according to interesting distributions to retain the physical operator with the overall cheapest cost and to retain the physical operator with the cheapest cost that has an output distribution that matches the interesting distribution.

FIG. 1 illustrates an example computer architecture 100 that facilitates identifying and propagating interesting properties within a SQL Server MEMO. Referring to FIG. 1, computer architecture 100 includes distribution identifier 102. Distribution identifier 102 can be a module in a query optimization system. Distribution identifier 102 can be connected to other modules and computer systems over a network, such as, for example, a Local Area Network ("LAN"), a Wide Area Network ("WAN"), and even the Internet. Accordingly, distribution identifier 102 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

In general, a SQL server MEMO can include two kinds of data structures: logical operations (or relational operations), which represent a relational operation (e.g. select, project, etc.) on one or more input groups and groups, which are a collection of logical operations that compute the same output at a particular point. These logical operations represent alternatives.

In some embodiments, distribution identifier 102 is resident at a computer system that includes one or more processors and system memory. The computer system can be connected to a plurality of compute nodes configured in a shared-nothing architecture. A distributed database can be distributed across the plurality of compute nodes. Each compute node in the plurality of compute nodes maintains a portion of the distributed database in a local database instance.

In general, distribution identifier 102 is configured to identify interesting distributions associated with logical operations in a SQL server MEMO. Distribution identifier 102 can annotate logical operations to indicate associated interesting distributions. Distribution identifier 102 can also propagate interesting distributions top down to other logical operations by annotating the other logical operations. Interesting distributions be properties of groups in the SQL server MEMO.

Thus, starting at the root group of the SQL server MEMO, for each logical operation in that group, interesting distributions are obtained. Interesting distributions include: hash distributions on equi-join predicates for joins, hash distributions of group-by/partitioning columns for grouping/partitioning operators, replicated distributions for a join operator, replicated distributions for a grouping operator, replicated distributions for a partitioning operator, indications that a table is located on a control node of a distributed database, etc. For each logical operation, the computed interesting distributions are added as properties to its child groups. In such a manner, interesting distributions are assigned to each group in the MEMO in a top-down (i.e. parents before children) until all groups including the base groups are assigned relational operators.

For example, in a hierarchically arranged SQL server MEMO, interesting distributions computed for higher logical operations (e.g., closer to a root operation) can be propagated down to lower logical operations (e.g., closer to leaf operations). An annotated interesting distribution may or may not be applicable for a particular logical operation. When an interesting distribution is not applicable for a logical operation it can be ignored for that operation. However, the logical operation can still be annotated to indicate the interesting distribution. Accordingly, the interesting distribution can be further propagated down to even lower logical operations (for which the interesting distribution may be applicable).

FIG. 2 illustrates a flow chart of an example method 200 for identifying and propagating interesting properties within a SQL Server MEMO. Method 200 will be described with respect to the components and data of computer architecture 100.

Method 200 includes accessing a SQL Server MEMO for a query of the distributed database, the SQL Server MEMO including a plurality of groups of logical operators arranged in a hierarchically structure, the hierarchical structure including a root group, one or more intermediate groups, and one or more leaf groups, each group of logical operators including one or more logical operators on one or more input groups (201). For example, distribution identifier 102 can access SQL server MEMO 101 for a query of a distributed database. SQL server MEMO 101 includes root operations group 111, intermediate operations groups 121 and 122, and leaf operations groups 131, 132, and 142 arranged in a hierarchical structure. Each of root operations group 111, intermediate operations groups 121 and 122, and leaf operations groups 131, 132, and 142 includes one or more logical operators on one or more input groups.

For each of the plurality of groups, starting at the root group and in a top down manner, method 200 includes identifying interesting distributions relevant to any child groups of the group (202) and adding the identified interesting distributions to the child groups by annotating the child groups with the interesting distributions (203). For example, distribution identifier 102 can formulate annotated SQL server MEMO 101A from SQL server MEMO 101.

Distribution identifier 102 can initially compute interesting distribution properties 181 and 182 for root operations group 111. Distribution identifier 102 can add distribution property 181 to distribution properties 151 for intermediate operations group 121. Similarly, distribution identifier 102 can add distribution property 182 to distribution properties 152 for intermediate operations group 122.

Subsequently, distribution identifier 102 can compute that there are no further interesting distribution properties for intermediate operations group 121. Distribution identifier 102 can propagate distribution property 181 to distribution properties 161 for leaf operations group 131.

Distribution identifier 102 can also compute interesting distribution properties 183 and 184 for intermediate operations group 122. Distribution identifier 102 can add distribution property 183 to distribution properties 162 for intermediate operations group 132. Similarly, distribution identifier 102 can add distribution property 184 to distribution properties 172 for intermediate operations group 142. Distribution identifier 102 can also propagate distribution property 182 to distribution properties 162 for leaf operations group 132.

Accordingly, interesting distributions are assigned to each group included in SQL server MEMO 101 in a top-down (parents before children) manner until all groups including the base groups are assigned relational operators.

Distribution properties 181, 182, 183, and 184 can representing interesting distributions including: hash distributions on equi-join predicates for joins, hash distributions of group-by/partitioning columns for grouping/partitioning operators, replicated distributions for a join operator, replicated distributions for a grouping operator, replicated distributions for a partitioning operator, indications that a table is located on a control node of a distributed database, etc.

In some embodiments, identifying interesting distributions for the logical operator comprises identifying interesting distributions for a top operator. An interesting distribution for a top operator can include a combination of a replicated distribution and an indication that a table is located on a control node of the distributed database.

In other embodiments, identifying interesting distributions for a logical operator comprises identifying interesting distributions for an insert operator. The insert operator can insert rows from a source select statement into a table, the table being hash distributed on a column. Identifying an interesting distribution for an insert operator can include identifying the hash distribution of the column as an interesting distribution for the insert operator.

Figure 3:
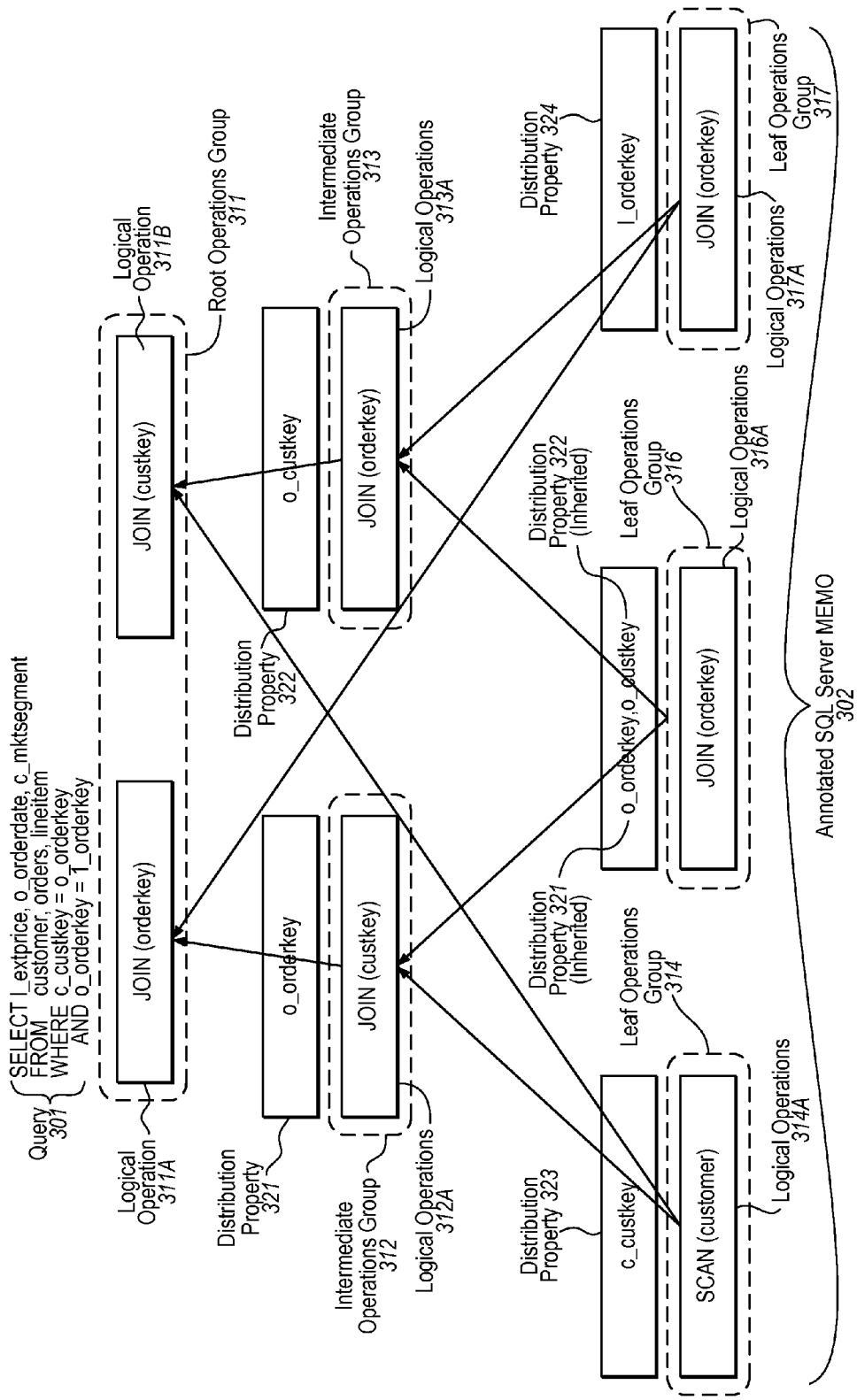
FIG. 3 illustrates an example query and associated SQL Server MEMO annotated with interesting columns for groups of logical operations.

FIG. 3 illustrates an example query 301 and associated SQL Server MEMO 302 annotated with interesting columns for groups of logical operations.

As depicted, distribution property 321 and distribution property 324 are computed for logical operation 311A in root operations group 311. Distribution property 321 is pushed down to intermediate operations group 312. Distribution property 324 is pushed down to leaf operations group 317. Distribution property 324 can be of interest to logical operation 317A.

Distribution property 322 and distribution property 323 are computed for logical operation 311B in root operations group 311. Distribution property 322 is pushed down to intermediate operations group 313. Distribution property 323 is pushed down to leaf operations group 314. Distribution property 323 can be of interest to logical operation 314A.

It may be that no further distribution properties are computed for logical operation 312A in intermediate operations group 312. Distribution property 321 can be propagated from intermediate operations group 312 to leaf operations group 316. Similarly, it may be that no further distribution properties are computed for logical operation 313A in intermediate operations group 313. Distribution property 322 can be propagated from intermediate operations group 313 to leaf operations group 316. Distribution properties 321 and 322 can be of interest to logical operation 316A.

Figure 4:
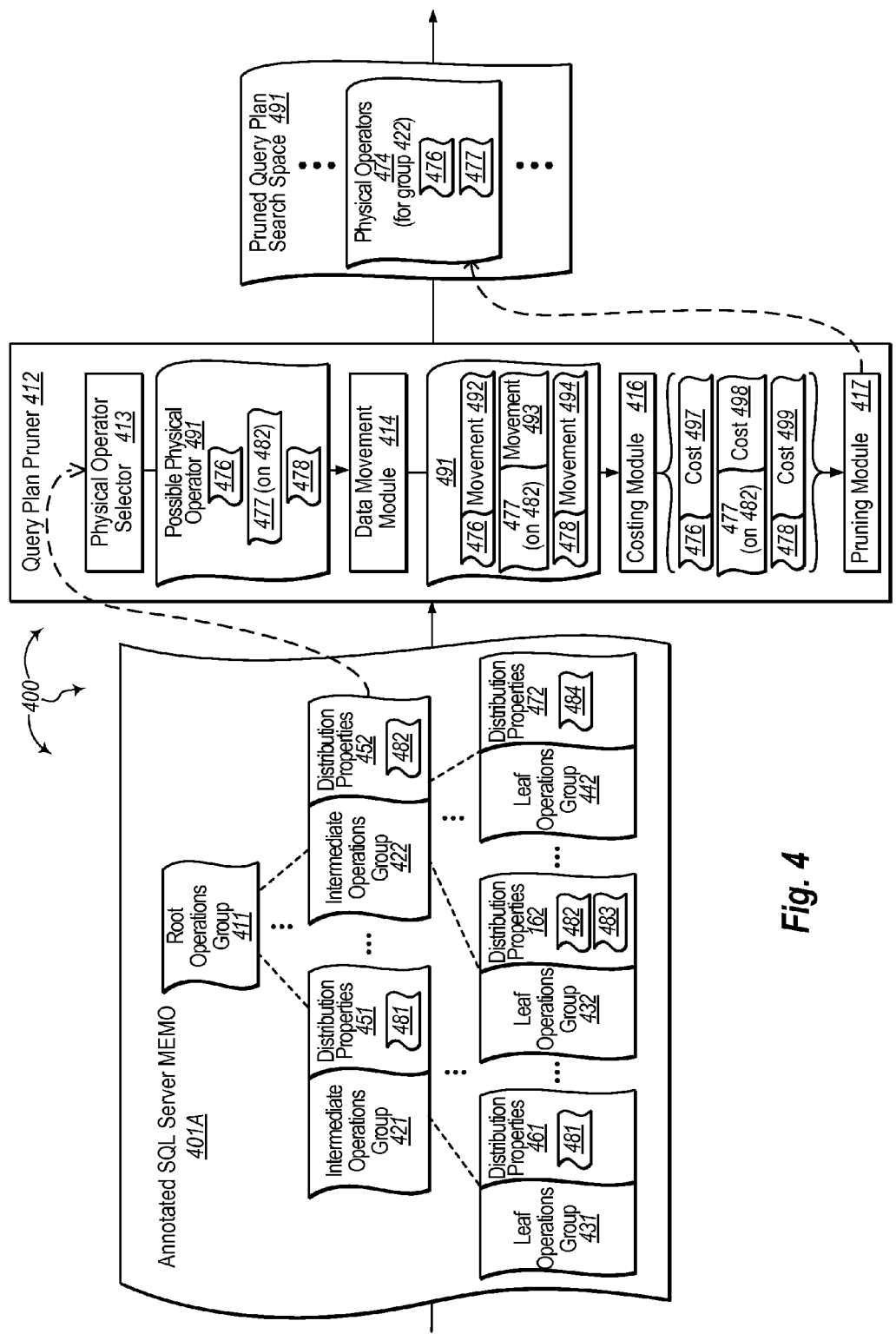
FIG. 4 illustrates an example computer architecture that facilitates using identified interesting properties within an annotated SQL Server MEMO to prune a query plan search space.

Turning to FIG. 4, FIG. 4 illustrates an example computer architecture 400 that facilitates using identified interesting properties within an annotated SQL Server MEMO to prune a query plan search space. Computer architecture 400 includes query plan pruner 412. Query plan pruner 412 can be a module in a query optimization system. Query plan pruner 412 can be connected to other modules and computer systems over a network, such as, for example, a Local Area Network ("LAN"), a Wide Area Network ("WAN"), and even the Internet. Accordingly, query plan pruner 412 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

In some embodiments, query plan pruner 412 is resident at a computer system that includes one or more processors and system memory. The computer system can be connected to a plurality of compute nodes configured in a shared-nothing architecture. A distributed database can be distributed across the plurality of compute nodes. Each compute node in the plurality of compute nodes maintains a portion of the distributed database in a local database instance.

In general, query plan pruner 412 can prune more costly query plans (e.g., query plans having higher resource consumption) from a query plan search space for an annotated SQL server MEMO. As depicted, query plan pruner 412 includes physical operation selector 413, data movement module 414, costing module 416, and pruning module 417. Physical operation selector 413 is configured to select physical operators for implementing corresponding logical operations in a SQL server MEMO. Date movement module 414 is configured to examine possible input physical operators (from input groups) and determine if a logical operator is distribution compatible. If not, data movement module 414 inserts appropriate data movement operators to make the logical operator distribution compatible. Costing module 416 is configured to determine a cost for different sets of operators that can be used to implement a logical operation.

Determining a cost can be based on, for example, the type of logical operation, added movement operators, and partitioning column.

Pruning module 417 is configured to prune groups including physical operators. Pruning module 417 can be configured to retain an operator with the cheapest cost in a group. Pruning module 417 can also be configured to retain the cheapest operator that has an output distribution that matches a corresponding interesting distribution. Other operators can be discarded. Thus, both the cheapest operator and the cheapest operating that matches a corresponding interesting distribution can be retained. Retention in this manner helps ensure that even if there is an operator that is not the best at a certain stage in the plan, but might avoid data movement later (that is for an operator above it) in the plan, the operator can be retained.

Enumeration of alternatives and pruning can be performed in a bottom up manner. Leaf operations groups can be processed first. After that, intermediate operations groups closer to the leaf operations groups can be processed prior to intermediate operations groups closed to the root operations group. Lastly, the root operations group can be processed.

Figure 5:
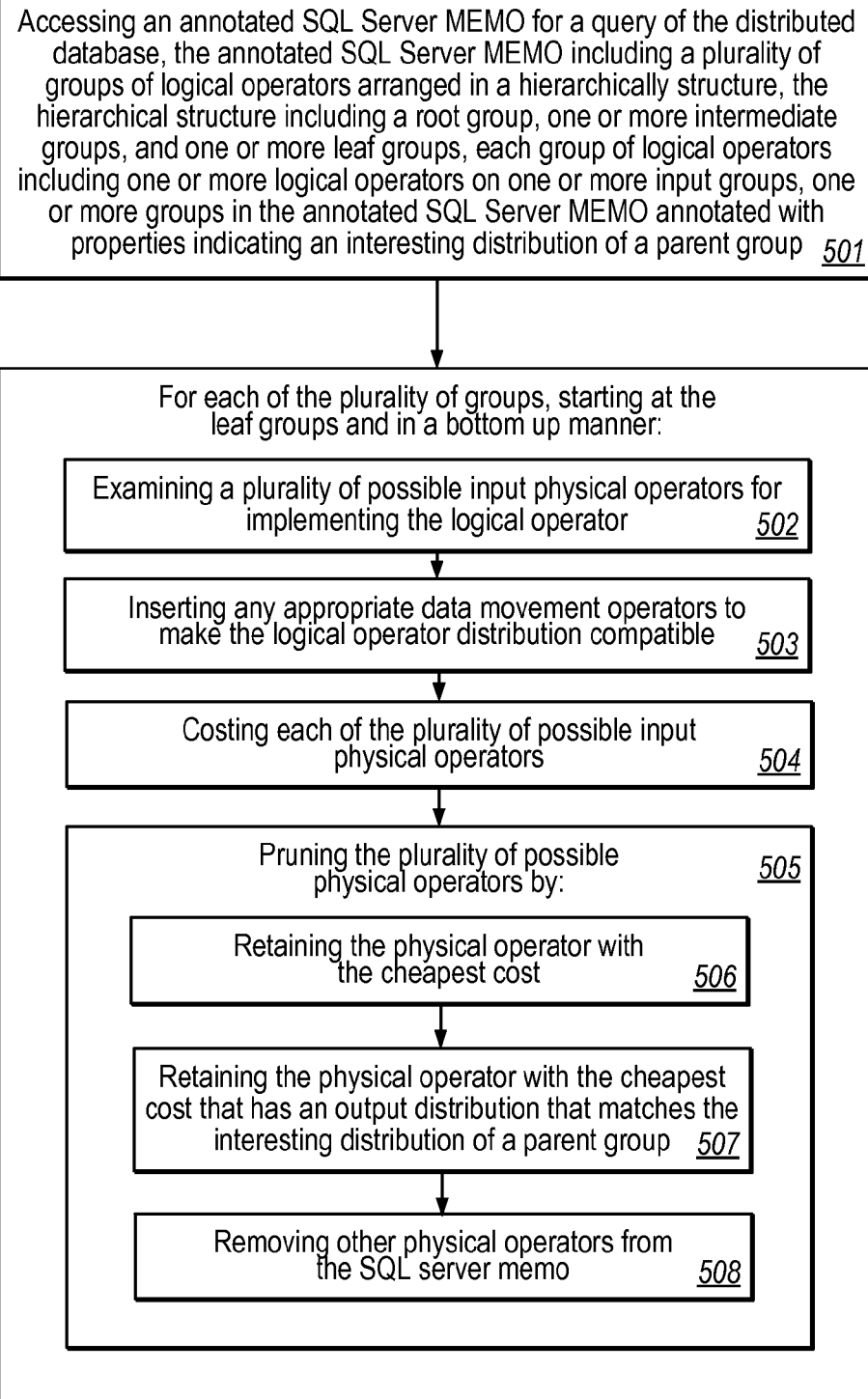
FIG. 5 illustrates a flow chart of an example method for using identified interesting properties within an annotated SQL Server MEMO to prune a query plan search space.

FIG. 5 illustrates a flow chart of an example method 500 for using identified interesting properties within an annotated SQL Server MEMO to prune a query plan search space. Method 500 will be described with respect to the components and data of computer architecture 400.

Method 500 includes accessing an annotated SQL Server MEMO for a query of the distributed database, the annotated SQL Server MEMO including a plurality of groups of logical operators arranged in a hierarchically structure, the hierarchical structure including a root group, one or more intermediate groups, and one or more leaf groups, each group of logical operators including one or more logical operators on one or more input groups, one or more groups in the annotated SQL Server MEMO annotated with properties indicating an interesting distribution of a parent group (501). For example, query plan pruner can access annotated SQL server MEMO 401A. Annotated SQL server MEMO 401A incudes root operations group 411, intermediate operations groups 421 and 422, and leaf operations groups 431, 432, and 442 arranged in a hierarchical structure.

Intermediate operations group 421 is annotated with distribution properties 451 including distribution property 481 from root operations group 411. Leaf operations group 431 is annotated with distribution properties 461 including distribution property 481 from root operations group 411 (and propagated through intermediate operations group 421).

Intermediate operations group 422 is annotated with distribution properties 451 including distribution property 482 from root operations group 411. Leaf operations group 432 is annotated with distribution properties 462 including distribution property 482 from root operations group 411 (and propagated through intermediate operations group 422) and distribution property 483 from intermediate operations group 422. Leaf operations group 442 is annotated with distribution properties 472 including distribution property 484 from intermediate operations group 422.

For each of the plurality of groups, starting at the leaf groups and in a bottom up manner for each logical operator in the group, possible physical operators can be selected for implementing the logical operator. For example, starting at leaf operator groups 431, 432, and 442, then moving to intermediate operations groups 421 and 422, and then moving on to root operations group 411, physical operation selector 413 can select possible physical operators for implementing the logical operations in each of these groups of operations. More specifically, with respect to intermediate operations group 422 as an example, physical operation selector 413 can select possible physical operations 491 for implementing intermediate operations group 422. Possible physical operations include physical operations 476, 477, and 478. Physical operation 477 has an output distribution matching interesting distribution 482.

For each of the plurality of groups, starting at the leaf groups and in a bottom up manner for each logical operator in the group, method 200 includes examining a plurality of possible input physical operators for implementing the logical operator (502). Continuing with the example for intermediate operations group 422, data movement module 414 can examine possible physical operators 491 to determine if any movement operators are appropriate.

For each of the plurality of groups, starting at the leaf groups and in a bottom up manner for each logical operator in the group, method 200 includes inserting any appropriate data movement operators to make the logical operator distribution compatible (503). Continuing with the example for intermediate operations group 422, data movement module 414 inserts movement operator 492 for use with physical operator 476. Data movement module 414 further inserts movement operation 493 for use with physical operator 477. Data movement module 414 also inserts movement operation 494 for use with physical operator 478.

For each of the plurality of groups, starting at the leaf groups and in a bottom up manner for each logical operator in the group, method 200 includes costing each of the plurality of possible input physical operators (504). Continuing with the example for intermediate operations group 422, costing module can calculate costs 497, 498, and 449 for physical operators 476, 477, and 478 respectively. Cost 497 can be the cheapest cost. Cost 477 can be the cheapest cost with an output distribution matching interesting distribution 482. Cost 499 can be more expensive the cost 497.

For each of the plurality of groups, starting at the leaf groups and in a bottom up manner for each logical operator in the group, pruning the plurality of possible physical operators (505). Pruning includes retaining the physical operator with the cheapest cost (506). Pruning includes retaining the physical operator with the cheapest cost that has an output distribution that matches the interesting distribution of a parent group (507). Pruning includes removing any other physical operators (508). Continuing with the example for intermediate operations group 422, pruning module 417 can retain physical operator 476 based on cost 497 being the cheapest cost. Pruning module 417 can also retain physical operator 477 based on cost 498 being the cheapest cost for a physical operator having an output distribution that matches interesting distribution 482. Pruning module 417 can remove physical operator 488.

Query plan pruner can include physical operators 476 and 477 within physical operators 474 (for group 422) in pruned query search plan space 473.

Although 502-508 have been described with respect to intermediate operations group 422, 502-508 are equally application to other operations groups in annotated SQL server MEMO 401A.

A query plan for implementing a query corresponding to annotated SQL server MEMO 401A can be selected from pruned query plan search space 473.

Figure 6:
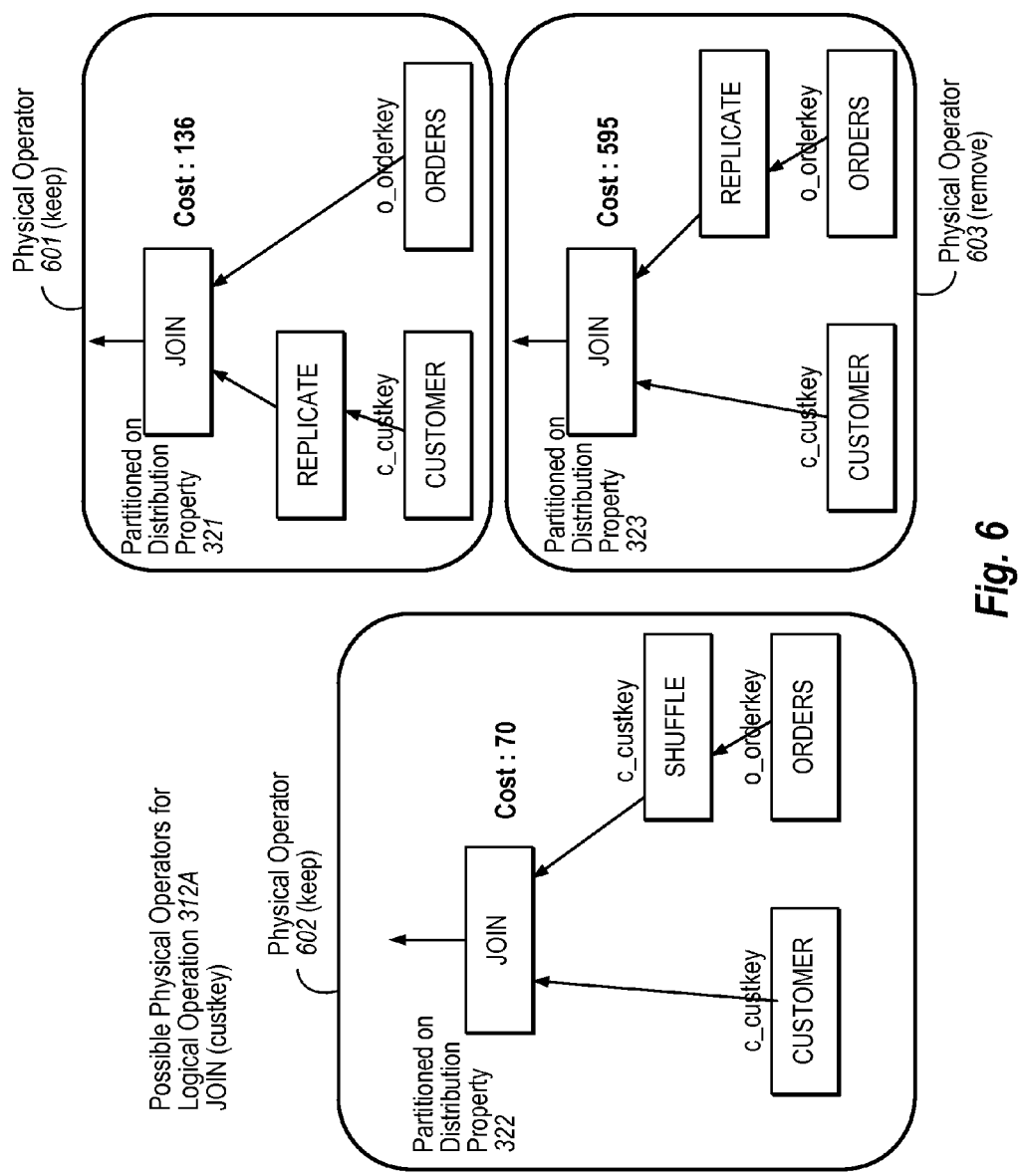
FIG. 6 illustrates an example of pruning physical operators for a group of logical operations.

FIG. 6 illustrates an example of pruning physical operators for a group of logical operations. More specifically, referring back to FIG. 3, possible physical operators for logical operation 312A "JOIN (custkey)" are shown. Possible physical operators include physical operators 601, 602, and 603. Physical operator 601 is partitioned on distribution property 321. Physical operator 602 is partitioned on distribution property 323. Physical operator 603 is partitioned on distribution property 323.

Based on cost and distribution properties, a pruning module, such as, for example, pruning module 417, can retain physical operators 601 and 602 and remove physical operator 603. Physical operator 601 has the cheapest cost, "Cost: 70". Physical operator 602 has the cheapest cost, "Cost: 136", for a physical operation partitioned on distribution property 321 (i.e., the distribution property on logical operation 312A).

Figure 7:
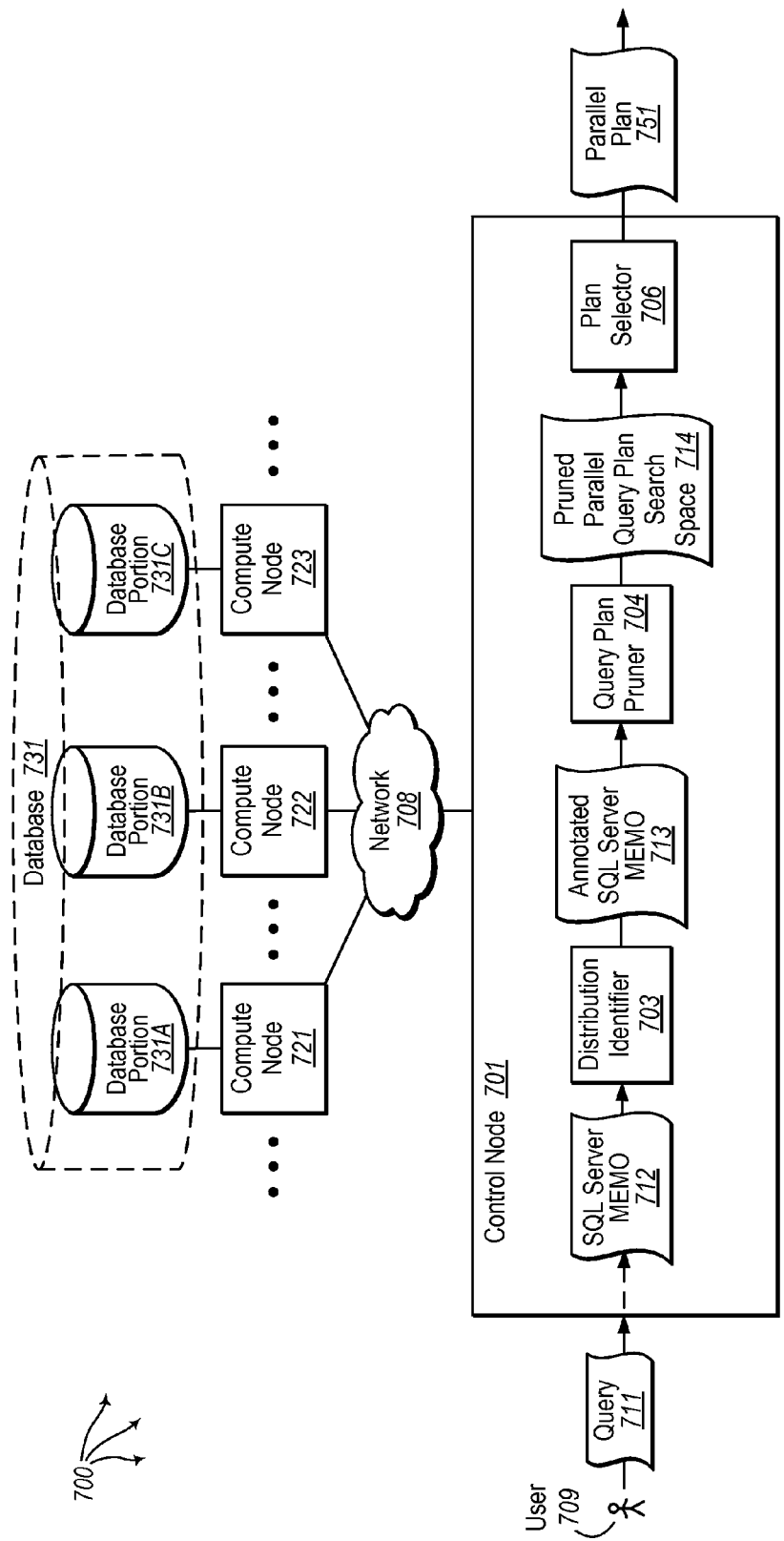
FIG. 7 illustrates an example computer architecture that facilitates selecting a parallel query plan from a pruned query search space.

FIG. 7 illustrates an example computer architecture 700 that facilitates selecting a parallel query plan from a pruned query search space. Referring to FIG. 7, computer architecture 700 includes control node 701, and compute nodes 721, 722, and 723. Control node 101 and compute nodes 721, 722, and 723 can be connected to one another over (or be part of) network 708, such as, for example, a Local Area Network ("LAN"), a Wide Area Network ("WAN"), and even the Internet. Accordingly, control node 701 and compute nodes 121, 122, and 123 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over network 108.

Control node 701 and compute nodes 721, 722, and 723 are configured in a shared-nothing architecture. As such, control node 701 and each of compute nodes 721, 722, and 723 maintain separate memory (e.g., RAM) and separate storage resources (e.g., disk drives) from other nodes. Database 731 is distributed across computer node 721, 722, and 723, which maintain database portions 731A, 731B, and 731C respectively. Control node 701 includes abstraction hardware and/or software components that abstract the distributed nature of database 731. Control node 701 can use the abstraction hardware and/or software components to present database 731 as a standalone database to user 709. Thus, user 709 can interact with database 731 using commands compatible with a standalone database (including submitting queries).

The ellipses before, between, and after compute nodes 721, 722, and 723 represent that other compute nodes can be included in the shared-nothing architecture. These other compute nodes may store portions of other databases. In addition to storing a portion of database 731, compute nodes 721, 722, and 723 may also store portions of these other databases.

Users or other computer systems can request retrieval of data from database 731 by submitting queries. Queries of database 731 can be received at control node 701. Queries can be submitted in a programming language, such as, for example, SQL, and can express a logical intent for retrieving specified data from database 731.

For any query, there can be a plurality of different sets of physical operations that can be executed to implement the expressed logical intent. In general, control node 701 can select a parallel query plan that is at least better than many other parallel query plans for implementing an expressed logical intent of a query. Control node 701 can balance the amount of time spent selecting a parallel query plan against the amount time for running a parallel query plan.

As depicted, control node 701 includes distribution identifier 701, query plan pruner 704, and plan selector 706.

Distribution identifier 701 can include functionality similar to distribution identifier 102. Query plan pruner 704 can include functionality similar to query plan pruner 412. Plan selection 706 can access a pruned parallel query plan search space and identify a parallel query plan for implementing expressed logical intent of a query.

In one embodiment, user 709 submits query 711 to control node 701. Control node 701 converts query 711 into SQL server MEMO 712. Distribution identifier 703 identifies interesting distributions in SQL server MEMO 712. Distribution identifier 703 annotates logical operation groups in SQL server MEMO to formulae annotated SQL server MEMO 713.

Query plan pruner 704 can access annotated SQL server MEMO. Query plan pruner can formulate pruned parallel query plan search space 714. Pruned parallel query plan search space 714 can include cheaper cost physical operators relative to other possible physical operators. Cheaper cost physical operators can be cheaper over all or cheaper for a particular interesting distribution.

Plan selector 706 can access pruned parallel query plan search space 714. Plan selector 706 can select parallel plan 751 from pruned parallel query plan search space 714.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computer system, the computer system comprising:
one or more hardware processors;
system memory coupled to the one or more hardware processors, the system memory storing instructions that are executable by the one or more hardware processors; and
the one or more hardware processors executing the instructions stored in the system memory to optimize a query, including the following:
access a query plan search space for a query of a distributed database, the query plan search space including a hierarchical structure of a root group of logical operators, one or more intermediate groups of logical operators, and one or more leaf groups of logical operators; and
formulate an annotated query plan search space for the query, including:
identify a distribution property for a child group of at least one other group, the at least one other group selected from among: the root group and the one or more intermediate groups, the distribution property indicating type of distribution relevant to the child group, the distribution property identifying a column that data for a parent group is distributed on, the parent group being above the child group in the hierarchical structure; and
annotate the child group with the type of distribution by attaching an indication of the identified column to the child group to propagate the identified type of distribution to the child group for use in query plan pruning.

2. The computer system of claim 1, wherein the one or more hardware processors executing the instructions to identify a distribution property comprises the one or more hardware processors executing the instructions to identify one or more of: a hash-distribution on equi-join predicates for joins, a hash distribution of group-by/partitioning columns for grouping/partitioning operators, a replicated distribution for a join operator, a replicated distribution for a grouping operator, a replicated distribution for a partitioning operator, or an indication that a table is located on a control node of the distributed database.

3. The computer system of claim 1, wherein the one or more hardware processors executing the instructions to identify a distribution property comprises the one or more hardware processors executing the instructions to identify a distribution property that indicates a type of distribution for a top operator.

4. The computer system of claim 1, wherein the one or more hardware processors executing the instructions to identify a distribution property comprises the one or more hardware processors executing the instructions to identify distribution property for a type of distribution that includes a combination of a replicated distribution and an indication that a table is located on a control node of the distributed database.

5. The computer system of claim 1, wherein the one or more hardware processors executing the instructions to identify a distribution property comprises the one or more hardware processors executing the instructions to identify distribution property that indicates a type of distribution for an insert operator, the insert operator inserting rows from a source select statement into a table, the table being hash distributed on the column.

6. The computer system of claim 5, wherein the one or more hardware processors executing the instructions to identify a distribution property that indicates type of distribution for an insert operator comprises the one or more hardware processors executing the instructions to identify a distribution property that indicates the hash distribution of the column as the type of distribution for the insert operator.

7. The computer system of claim 1, wherein the one or more hardware processors executing the instructions to identify a distribution property comprises the one or more hardware processors executing the instructions to identify a distribution property for an inherited distribution type that originated at and was inherited from the parent group.

8. The computer system of claim 7, wherein the one or more hardware processors executing the instructions to annotate the child group with the type of distribution comprises the one or more hardware processors executing the instructions to propagate the inherited distribution type down to one or more further child groups of the child group, the one or more further child groups selected from among: the one or more intermediate groups and the one or more leaf groups.

9. The computer system of claim 1, wherein the one or more hardware processors executing the instructions to identify a distribution property comprises the one or more hardware processors executing the instructions to identify a distribution identifier for a type of distribution generated by one or more logical operators in the at least one other group.

10. The computer system of claim 9, wherein the one or more hardware processors executing the instructions to annotate the child group with the type of distribution comprises the one or more hardware processors executing the instructions to add the type of distribution generated by the one or more logical operators to one or more further child groups of the child group, the one or more further child groups selected from among: the one or more intermediate groups and the one or more leaf groups.

11. A method for use at a computer system, the computer system including one or more processors and system memory, the method for optimizing a query, the method comprising:
accessing a query plan search space for a query of a distributed database, the query plan search space including a hierarchical structure of a root group of logical operators, one or more intermediate groups of logical operators, and one or more leaf groups of logical operators; and
formulating an annotated query plan search space for the query by:
identifying a distribution property for a child group of at least one other group, the at least one other group selected from among: the root group and the one or more intermediate groups, the distribution property indicating type of distribution relevant to the child group, the distribution property identifying a column that data for a parent group is distributed on, the parent group being above the child group in the hierarchical structure; and
annotating the child group with the type of distribution by attaching an indication of the identified column to the child group to propagate the identified type of distribution to the child group for use in query plan pruning.

12. The method of claim 11, wherein identifying a distribution property indicating a type of distribution relevant to the child group comprises identifying one or more of: a hash-distribution on equi-join predicates for joins, a hash distribution of group-by/partitioning columns for grouping/partitioning operators, a replicated distribution for a join operator, a replicated distribution for a grouping operator, a replicated distribution for a partitioning operator, or an indication that a table is located on a control node of the distributed database.

13. The method of claim 11, wherein identifying a distribution property comprises identifying a distribution property of the at least one other group.

14. The method of claim 11, wherein identifying a distribution property comprises identifying distribution property that identifies a column that data for the parent group is distributed on, the parent group selected from among: the root group and the one or more intermediate groups.

15. The method of claim 11, wherein identifying a distribution property comprises identifying a distribution property that indicates a type of distribution for an insert operator, the insert operator inserting rows from a source select statement into a table, the table being hash distributed on the column.

16. The method of claim 15, wherein identifying a distribution property that indicates a type of distribution for an insert operator comprises identifying the hash distribution of the column as the type of distribution for the insert operator.

17. The method of claim 11, wherein identifying a distribution property comprises identifying a distribution property for an inherited distribution type that originated at and was inherited from the parent group; and
wherein annotating the child group with the type of distribution comprises propagating the inherited distribution type down to one or more further child groups of the child group.

18. The method of claim 11, wherein identifying a distribution property comprises identifying distribution property for a type of distribution generated by one or more logical operators in the at least one other group; and wherein annotating the child group with the type of distribution comprises:
  annotating an intermediate group with the type of distribution, the intermediate group selected from among the one or more intermediate groups; and
  adding the type of distribution to one or more further child groups of the intermediate group.

* * * * *